Dec. 2, 1952        G. E. DATH        2,620,179
SHOCK ABSORBER FOR RAILWAY CAR TRUCK SPRINGS
Filed April 9, 1949        2 SHEETS—SHEET 1
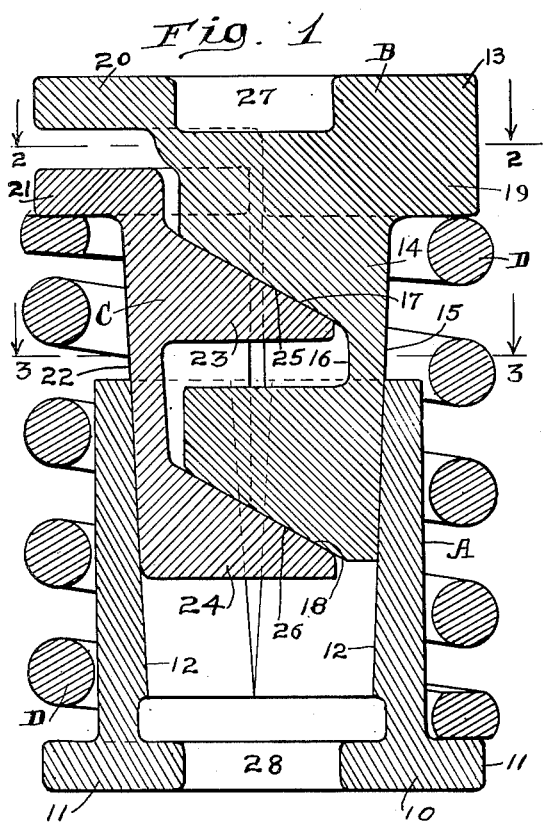
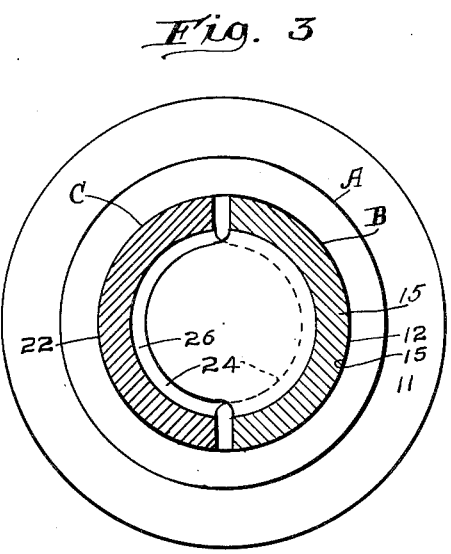
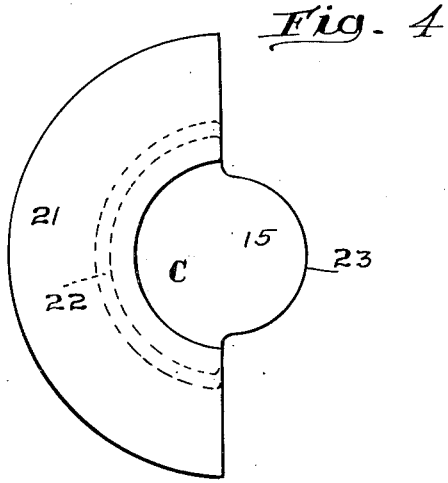
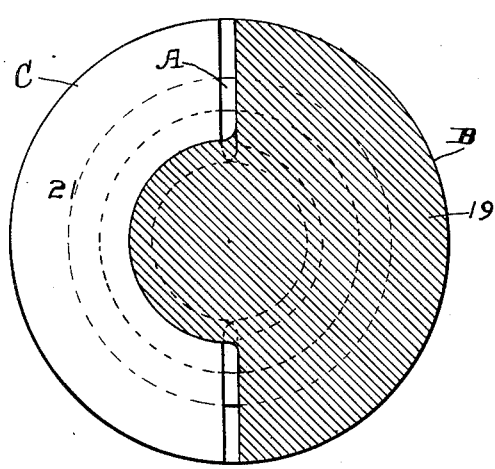
Inventor.
George E. Dath.
By Henry Fuchs.
Atty.

Dec. 2, 1952 — G. E. DATH — 2,620,179
SHOCK ABSORBER FOR RAILWAY CAR TRUCK SPRINGS
Filed April 9, 1949 — 2 SHEETS—SHEET 2

Inventor:
George E. Dath.
By Henry Fuchs.
Atty

Patented Dec. 2, 1952

2,620,179

UNITED STATES PATENT OFFICE 2,620,179

SHOCK ABSORBER FOR RAILWAY CAR TRUCK SPRINGS

George E. Dath, Mokena, Ill., assignor to W. H. Miner, Inc., Chicago, Ill., a corporation of Delaware Application April 9, 1949, Serial No. 86,427

7 Claims. (Cl. 267—9)

1

This invention relates to improvements in shock absorbers especially adapted for use as snubbing devices in connection with truck springs of railway cars.

One object of the invention is to provide a friction shock absorber functioning as a snubbing device for the truck springs of railway cars, comprising a friction casing, a friction shoe, a combined friction shoe and wedge block, and spring means yieldingly opposing movement of the shoe and combined wedge block and shoe toward the casing, wherein both the combined wedge block and shoe and the shoe have sliding frictional engagement with the casing and wherein the combined wedge block and the shoe have wedging engagement with each other to spread the same apart into tight frictional contact with said casing.

A further object of the invention is to provide a friction shock absorbing mechanism, as set forth in the preceding paragraph, wherein the spring means, which opposes movement of the combined wedge block and shoe and the shoe toward the casing, is in the form of a helical coil surrounding the casing, buttressed at one end against the casing and having its other end bearing at one side of the mechanism on the combined wedge block and shoe and at the other side of the mechanism on the shoe to resist movement of said combined wedge block and shoe and the shoe independently of each other.

Other objects of the invention will more clearly appear from the description and claims hereinafter following.

Figure 5:
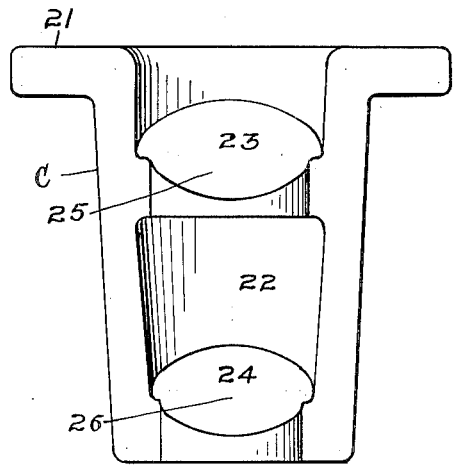
Figure 6:
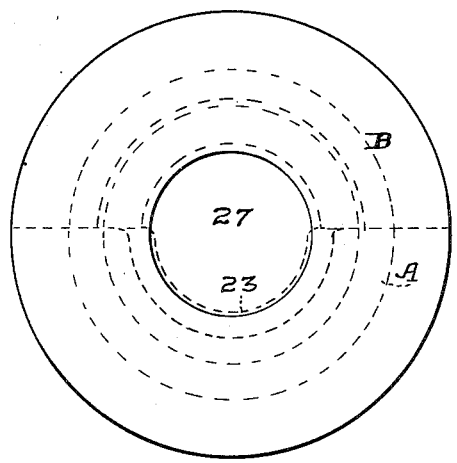
Figure 7:
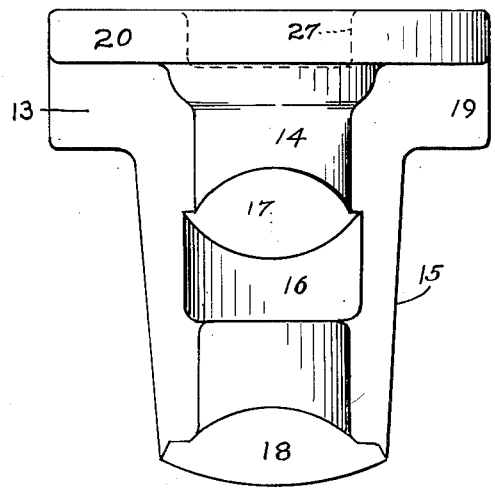

In the accompanying drawings forming a part of this specification, Figure 1 is a vertical sectional view of my improved shock absorber. Figures 2 and 3 are horizontal sectional views, corresponding respectively to the lines 2—2 and 3—3 of Figure 1. Figure 4 is a top plan view of the friction shoe member illustrated in Figure 1. Figure 5 is a side elevational view of Figure 4, looking from right to left in said figure. Figure 6 is a top plan view of the combined wedge and friction shoe member illustrated in Figure 1, turned through an angle of 90 degrees. Figure 7 is a side elevational view of Figure 6, looking upwardly in said figure.

As illustrated in the drawings, my improved shock absorber comprises broadly a friction casing A, a combined wedge and friction shoe member B, a friction shoe member C, and a spring D.

The casing A is in the form of a cylindrical, tubular member having at its bottom end a transverse wall 10. The wall 10 is extended laterally

2 outwardly of the casing, thereby providing an annular spring abutment flange or follower 11. The upper or open end of the casing is provided with two longitudinally extending, transversely curved, diametrically opposite, interior friction surfaces 12—12, which converge inwardly of the casing and are formed on the cylindrical wall of said casing. The bottom wall 10 of the casing has a central opening 28 therethrough, adapted to accommodate the usual spring centering projection of the bottom spring follower plate of a truck spring cluster.

The combined wedge and friction shoe member B comprises a disclike follower 13 and a postlike member 14, depending from the follower 13. The postlike member 14 presents a lengthwise extending, transversely curved friction surface 15 of true cylindrical shape on its outer side, having sliding engagement with the friction surface 12 of the casing at the right hand side of the mechanism, as illustrated in Figure 1. At the side thereof opposite to the surface 15, the postlike member is cut out between its ends, as indicated at 16. The top wall of the cut out portion 16 is inclined, as shown, and presents a wedge face 17. As its lower end, the postlike member is provided with a second wedge face 18 on its inner side, which is parallel to the wedge face 17. The disclike follower 13 is thickened at the friction surface side of the postlike member, as shown, thus presenting a relatively thick, flangelike section 19, which serves as an abutment for the upper end of the spring D at the right hand side of the mechanism, as seen in Figure 1. The relatively thinner, flangelike section of the follower, at the diametrically opposite side thereof to the flangelike section 19, is indicated by 20 in Figure 1.

The friction shoe member C has a laterally outwardly projecting, semi-circular flange 21 at its upper end forming an abutment for the upper end of the spring D at the left hand side of the mechanism, as seen in Figure 1. The main body portion of the shoe member C presents a transversely curved, lengthwise extending, friction surface 22 on its outer side slidably engaged with the friction surface 12 at the left hand side of the casing, as seen in Figure 1. On its inner side, the main body portion of the shoe member C has two lateral enlargements 23 and 24, respectively, at its upper and lower ends. The enlargement 23 extends into the cut out portion 16 of the combined wedge and shoe member B and has a wedge face 25 at its upper side, correspondingly inclined to and engaged with the wedge face 17 of the member B. The enlargement 24 of the shoe member C extends beneath the member B and has a wedge face 26 at its upper side, correspondingly inclined to and engaged with the wedge face 18 of the member B.

The spring D is in the form of a helical coil surrounding the casing A and has its bottom end seated on the flange 11 of the casing A. As seen in Figure 1, at the right hand side of the mechanism, the top end of the spring D bears on the flange 19 of the member B, and at the left hand side of the mechanism said spring bears on the flange 21 of the shoe member C. As will be seen upon reference to Figure 1, in the normal full release position of the parts of the mechanism, the bottom face of the flange 21 of the shoe member C and the bottom face of the flange 19 of the member B lie in substantially the same horizontal plane. It is further pointed out that, in the normal position of the parts, substantial clearance is provided between the flange 21 of the shoe member C and the flange 20 of the member B, and between the enlargement 23 of the shoe and the bottom wall of the cut out portion 16 of the member B.

My improved shock absorber replaces one of the coils of a truck spring cluster of a railway car, and is interposed between the usual top and bottom spring plates thereof with the spring centering projections of the latter engaged in a central seat 27 provided in the member B and within the opening 28 of the bottom wall 10 of the casing A.

The operation of my improved shock absorber is as follows: Upon the cluster of springs of a railway car truck being compressed between the spring follower plates of the truck springs, the member B is forced downwardly toward the casing A, against the resistance of the spring D, which bears on the flange 19 of said member. The shoe member C and the combined wedge and shoe member B are thus wedged apart against the friction surfaces of the casing. At the same time, the shoe member C is forced downwardly against the resistance of the spring D, which bears on the flange 21 of said shoe member. Frictional resistance to relative movement of the members B and C and the casing A is thus provided, snubbing the action of the truck springs. During recoil of the truck springs, the spring D returns the members B and C to the normal position shown in Figure 1.

I claim:

1. In a friction shock absorber, the combination with a friction casing; of a friction shoe member and a combined wedge and friction shoe member having sliding engagement within the casing; wedge faces on each of said members, the wedge faces of one of said members being engaged with the wedge faces of the other of said members; and a spring directly buttressed against each of said members and buttressed against the casing to yieldingly oppose movement of said members inwardly of the casing independently of each other.

2. In a friction shock absorber, the combination with a friction casing; of a friction shoe member and a combined wedge and friction shoe member having sliding engagement within the casing; wedge faces on each of said members, the wedge faces of one of said members being engaged with the wedge faces of the other of said members; and a single coil spring, at one end, directly engaging each of said members and buttressed, at its other end, against the casing to yieldingly oppose movement of said members inwardly of the casing independently of each other.

3. In a friction shock absorber, the combination with a friction casing; of a friction shoe member; a combined wedge and friction shoe member in wedging engagement with said shoe member, said members being slidingly telescoped within the casing; and a coil spring surrounding said casing and yieldingly opposing movement of both of said members inwardly of the casing, said spring bearing at one end on said casing, the other end of said spring being buttressed against the shoe member at one side of the mechanism and buttressed against the combined wedge and shoe member at the opposite side of the mechanism.

4. In a friction shock absorber, the combination with a friction casing having a follower flange at its outer end, said casing having interior friction surfaces at its inner end; of a friction shoe member; a combined wedge and friction shoe member in wedging engagement with said shoe member, said members having lengthwise extending friction surfaces in sliding engagement with the friction surfaces of the casing; and a coil spring surrounding the casing, bearing at one end on the follower flange of the same and bearing at its other end on said members, respectively, at opposite sides of the mechanism.

5. In a friction shock absorber, the combination with a friction casing having interior friction surfaces at its inner end at opposite sides thereof; of a follower flange at the outer end of said casing; a friction shoe member having a lengthwise extending friction surface on its outer side; a combined wedge and shoe member having a lengthwise extending friction surface on its outer side; wedge faces on the inner side of said shoe member; wedge faces on the inner side of said combined wedge and shoe member engaging the wedge faces of said shoe member, said members having their friction surfaces in lengthwise sliding engagement with the friction surfaces, respectively, of said casing, said shoe member having a laterally projecting flange at its outer end at one side of the mechanism, said combined wedge and shoe member having a laterally projecting flange at its outer end at the opposite side of the mechanism; and a coil spring surrounding said casing and bearing at one of its ends on said flange of the casing and at its other end on the flanges of both of said members.

6. In a friction shock absorber, the combination with a bottom friction casing having a laterally outwardly projecting follower flange at its bottom end, said casing being open at its upper end and having diametrically opposed, interior friction surfaces at said open end, extending lengthwise of said casing; of an upper friction shoe member at one side of the mechanism having a lengthwise extending, exterior friction surface in sliding engagement with one of the friction surfaces of the casing, said shoe member having a follower flange at the upper end thereof projecting from the friction surface side thereof; an upper combined wedge and friction shoe member having a lengthwise extending friction surface in sliding engagement with the other of said surfaces of the casing, said combined wedge and shoe member having a follower flange at the upper end thereof projecting from the friction surface side of the same, said members having interengaged wedge faces on their inner sides; and a coil spring surrounding said casing and bearing at its top end on said follower flanges of said members and at its bottom end on the flange of the casing.

7. In a friction shock absorber, the combination with a friction casing having transversely curved, interior friction surfaces at its inner end at opposite sides thereof; of a follower flange at the outer end of said casing; a friction shoe member having a lengthwise extending, transversely curved friction surface on its outer side and a wedge face on its inner side; a combined wedge and shoe member having a lengthwise extending transversely curved friction surface on its outer side and a wedge face on its inner side, said wedge face of the combined wedge and shoe member being engaged with the wedge face of said shoe member, said members having their friction surfaces in lengthwise sliding engagement with the friction surfaces, respectively, of said casing, said shoe member having a laterally projecting flange at its outer end at one side only of the mechanism, said combined wedge and shoe member having a laterally projecting flange at its outer end at the opposite side of the mechanism; and a coil spring surrounding said casing and bearing at one of its ends on said flange of the casing and at its other end on the flanges of both of said members.

GEORGE E. DATH.

REFERENCES CITED

The following references are of record in the file of this patent:

UNITED STATES PATENTS

| Number | Name | Date |
| --- | --- | --- |
| 1,136,022 | McCormick | Apr. 20, 1915 |
| 2,116,189 | Clark | May 3, 1938 |
| 2,490,738 | Lehrman | Dec. 6, 1949 |

FOREIGN PATENTS

| Number | Country | Date |
| --- | --- | --- |
| 552,698 | Germany | June 17, 1932 |